(12) United States Patent
Sukhomlinov et al.

(10) Patent No.: US 11,320,837 B2
(45) Date of Patent: May 3, 2022

(54) FEDERATED AUTOMATED INTEROPERATION BETWEEN PREMISES AND AUTONOMOUS RESOURCES

(71) Applicant: Intel Corporation, Santa Clara, CA (US)

(72) Inventors: Vadim Sukhomlinov, Santa Clara, CA (US); Kshitij Arun Doshi, Tempe, AZ (US); Katalin K. Bartfai-Walcott, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 15/694,250

(22) Filed: Sep. 1, 2017

(65) Prior Publication Data

US 2019/0072979 A1 Mar. 7, 2019

(51) Int. Cl.
*G05D 1/02* (2020.01)
*G06Q 20/32* (2012.01)
(Continued)

(52) U.S. Cl.
CPC ......... *G05D 1/0276* (2013.01); *G01C 21/206* (2013.01); *G05D 1/0088* (2013.01); *G05D 1/0202* (2013.01); *G05D 1/0282* (2013.01); *G06Q 20/14* (2013.01); *G06Q 20/3224* (2013.01); *G06Q 30/04* (2013.01); *G06Q 50/30* (2013.01); *G07G 1/0081* (2013.01); *H04W 12/06* (2013.01)

(58) Field of Classification Search
CPC .. G05D 1/0276; G05D 1/0088; G05D 1/0202; G05D 1/0282; G01C 21/206

USPC .......................................................... 705/13
See application file for complete search history.

(56) References Cited

U.S. PATENT DOCUMENTS 9,632,504 B1 4/2017 Watts
2015/0153175 A1 6/2015 Skaaksrud
(Continued)

FOREIGN PATENT DOCUMENTS

CN 105045195 A 11/2015
CN 106168805 A 11/2016
(Continued)

OTHER PUBLICATIONS

Dorling, Kevin. "Vehicle Routing Problems for Drone Delivery" https://ieeexplore.ieee.org/stamp/stamp.jsp?tp=&arnumber=7513397 Published on IEEE Jan. 2017 (Year: 2017).*
(Continued)

*Primary Examiner* — George Chen
*Assistant Examiner* — Lisa Ma
(74) *Attorney, Agent, or Firm* — Schwegman Lundberg & Woessner, P.A.

(57) ABSTRACT

In some embodiments, the disclosed subject matter involves communication and negotiation between an autonomous entity or vehicle with a network of communication resources within a smart premises. The communication resources may include entry, landing or navigation beacons and a building infrastructure service. Negotiation for guidance, entry and other authorized tasks or services may be performed in a distributed fashion while en route or in proximity to a communication resource, rather than scheduled by a centralized server. Other embodiments are described and claimed.

16 Claims, 5 Drawing Sheets

(51) Int. Cl.
*G06Q 50/30* (2012.01)
*G07G 1/00* (2006.01)
*G01C 21/20* (2006.01)
*G05D 1/00* (2006.01)
*G06Q 20/14* (2012.01)
*G06Q 30/04* (2012.01)
*H04W 12/06* (2021.01)

(56) References Cited

U.S. PATENT DOCUMENTS

| | | | |
|---|---|---|---|
| 2016/0253907 A1* | 9/2016 | Taveira | G07B 15/00 701/3 |
| 2017/0091710 A1* | 3/2017 | Van Dyke | H04L 67/42 |
| 2017/0110016 A1 | 4/2017 | Amarasekara et al. | |
| 2017/0160735 A1* | 6/2017 | Mikan | G08G 5/0034 |
| 2018/0137454 A1* | 5/2018 | Kulkarni | G08G 5/0021 |
| 2019/0034877 A1* | 1/2019 | Cantrell | G06Q 10/08355 |
| 2019/0043370 A1* | 2/2019 | Mulhall | B64D 1/08 |
| 2020/0356114 A1* | 11/2020 | Ucar | G05D 1/12 |

FOREIGN PATENT DOCUMENTS

| | | | | |
|---|---|---|---|---|
| CN | 111033420 | | 4/2020 | |
| CN | 111033420 | A | 4/2020 | |
| DE | 112018004863 | | 6/2020 | |
| DE | 112018004863 | T5 | 6/2020 | |
| WO | WO-2018063630 | A1 * | 4/2018 | ........... B64C 39/024 |
| WO | WO-2019046738 | A1 | 3/2019 | |

OTHER PUBLICATIONS

"International Application Serial No. PCT/US2018/049122, International Search Report dated Dec. 19, 2018", 4 pgs.

"International Application Serial No. PCT/US2018/049122, Written Opinion dated Dec. 19, 2018", 13 pgs.

Sawers, Paul, "Marble debuts its autonmonous food-delivery robots in partnership with Yelp", Venture Beat, https://venturebeat.com/2017/04/12/marble-debuts-its-autonomous-food-delivery-robots-in-partnership-with-yelp/, (Apr. 12, 2017), 7 pgs.

"International Application Serial No. PCT/US2018/049122, International Preliminary Report on Patentability dated Mar. 12, 2020", 15 pgs.

* cited by examiner

FEDERATED AUTOMATED INTEROPERATION BETWEEN PREMISES AND AUTONOMOUS RESOURCES

TECHNICAL FIELD

An embodiment of the present subject matter relates generally to autonomous traversal of a location, and, more specifically but not limited to interoperation between and among autonomous and robotic resources and premises.

BACKGROUND

Various mechanisms exist for navigation of public spaces by autonomous, devices, vehicles, drones or robots, also referred to as automatons, autonomous devices, and autonomous vehicles herein. Often navigation relies on machine vision, Light Detection and Ranging (LiDAR) and use of mapping techniques and identification of location by pinging various access points in the vicinity, or identification of visual landmarks. In current systems, a route to a location may be mapped out in advance with limited adaptability for changing conditions by the autonomous device. Often significant oversight and supervision by a human is necessary for the autonomous device to complete a task. For instance, package delivery by drones is being heavily researched and prototypes are being developed by Amazon, Inc. Marble Robotics and Yelp Eat24 are developing a system for food delivery by semi-autonomous vehicle, in San Francisco. However, in current systems, a human must monitor or guide the drone or robot through delivery. Further, deliveries are typically to an exterior location and the autonomous vehicle is not capable of entering a building and navigating to final delivery.

In existing systems, control of the autonomous device is from a centralized server or management and control device. Thus, the autonomous device typically receives instructions for an entire route or task from the centralized server and relies on the server to have up-to-date information for scheduling. Centralizing management of the autonomous device reduces adaptability to changing conditions, and relies on the centralized server to have complete information at the time of launch (e.g., commencement of activity or mission). If conditions change while en route, and the link between the autonomous device and centralized server is severed, the autonomous device may fail in its mission.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
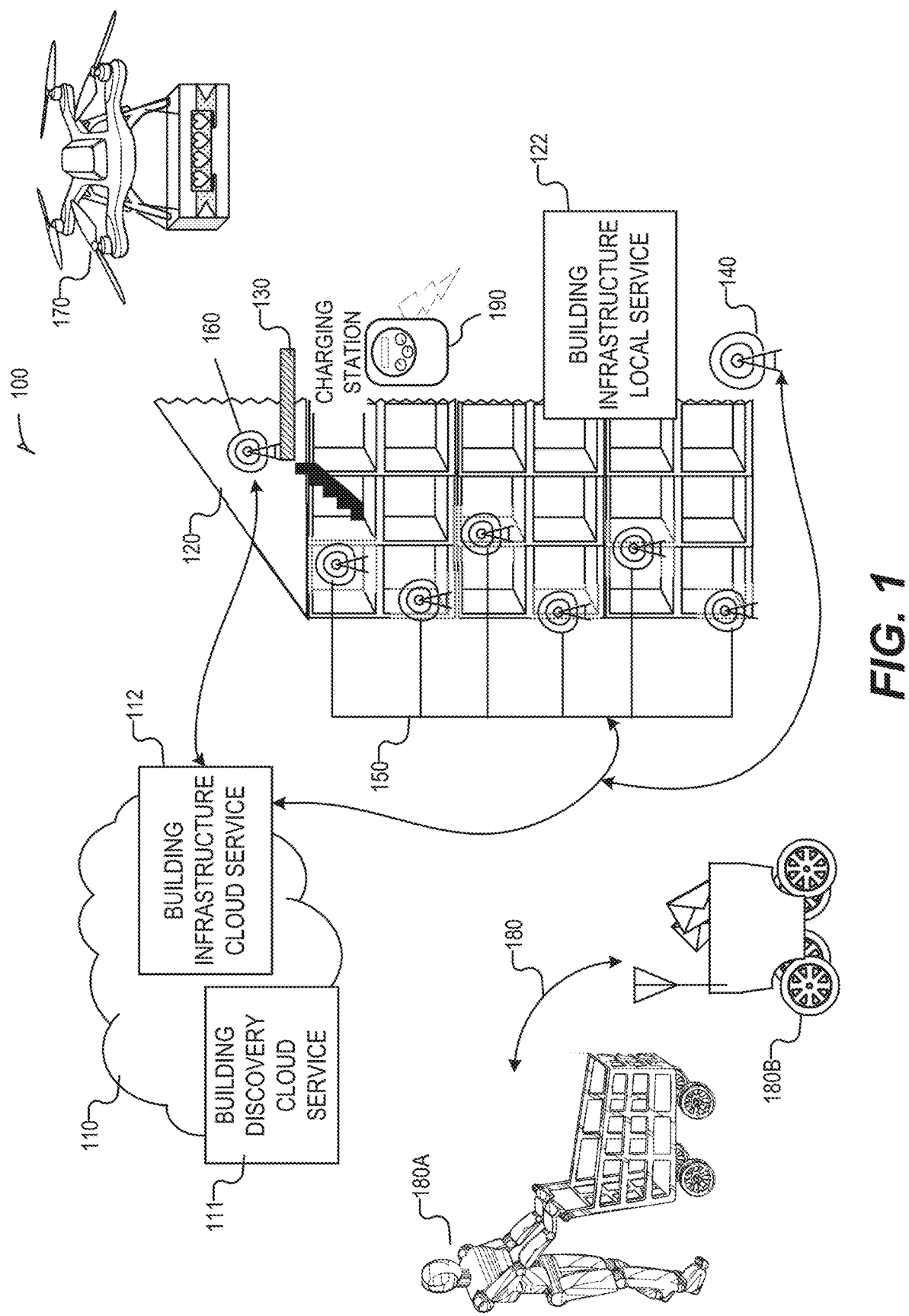
FIG. 1 is a diagram illustrating a system for federated automated interoperation between premises and robotic and autonomous resources, according to an embodiment.

In the following description, for purposes of explanation, various details are set forth in order to provide a thorough understanding of some example embodiments. It will be apparent, however, to one skilled in the art that the present subject matter may be practiced without these specific details, or with slight alterations.

An embodiment of the present subject matter is a system and method for federated automated interoperation between premises and robotic entities/autonomous resources. In an embodiment, an automaton may coordinate and interact with one or more cloud services and services provided by a smart premises to effect distributed interoperation and control or the automaton and its mission. A mission or goal may be for pickup or delivery of a package; an intermediate goal such as recharge or to receive maintenance; or a completion goal such as return to base or bill a customer. Successful completion of the mission may require several intermediate tasks and be affected by localized events. However, rather than have all intermediate tasks controlled by a centralized server, in advance, embodiments interoperate with premises, beacons, and cloud servers, and may react to localized events at each point in the mission to enable localized control and management at various points in the journey. Moreover, management of the automaton may be more predictive in nature than just reactive.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

As autonomous vehicles and drones master navigation of public outdoor spaces, a significant limitation is the lack of ability to navigate autonomously to a destination inside a building or to a space that is less than public (e.g., no public mapping available). Embodiments described herein extend autonomous traversal into smart premises. Simply arriving at a particular location by road may not suffice, if the goal is to deliver or pick up consignments or perform other automated destination services by visiting robotic entities. Autonomous robo-carts may have to enter a building, find an elevator, an entry door, etc. and return back. Drone based delivery services may need to find a specific location to drop a parcel for specific apartment's loggia, and may require charging to fly or navigate back to home base. Existing technologies are based on maps. However, most maps lacks details of internal building structure, landing zone for drones, customer delivery preferences, etc. Moreover, static maps may not have up to date details like construction works, access restrictions, temporary obstructions, weather conditions, etc.

An autonomous truck may relieve a human driver of much of the tedium and inefficiencies of driving. But the cumbersome task of delivering or picking up consignments remains after the vehicle has reached a destination, and this negates most of the benefit of autonomous driving. A human agent may do more than just reach a destination point. For example, the agent may enter a building, find an elevator, choose an entry door to an office out of a possible multiplicity of doors, obtain/deliver different forms of acknowledgment, and return to home base. The agent may also perform a pre-directed operation such as ringing a bell to alert a target. In at least one embodiment, an autonomous device may navigate from a home base to a final destination inside a building or premises for a delivery or pickup. In an embodiment, a drone may navigate to a landing site within, or atop a building or premises.

Previous solutions might consider automating this pickup/delivery task by preprogramming a route from the point where a vehicle reaches some enterprise's curb stop. Some obvious difficulties arise with this solution such as: (a) the internal layout of a building or campus may be obscured for privacy or security reasons; (b) the end point for delivery itself is changeable due to repairs or reassignments; (c) possible multiple end points share a shipping address but each is designed to handle different consignments; and (d) different paths and modalities need to be used for different types of goods.

Another possible solution might include using a sophisticated label reading apparatus and a human natural language processing entity to let an autonomous robo-cart perform to a similar level of versatility but this could be a very expensive and complicated proposition and not sufficiently free from errors of training and navigation when employed on a wide scale. And that possible solution does not cover use cases for devices with extended (flight capable) or limited (e.g., "cannot use stairs") capabilities.

FIG. 1 is a diagram illustrating a system 100 for federated automated interoperation between premises and robotic and autonomous resources, according to an embodiment. In an embodiment, various services may be available via a cloud network 110. In an embodiment a building discovery cloud service (BDCS) 111 may be available on the cloud network 110. The BDCS 111 may communicate with autonomous devices 180 such as a robot with a cart 180A or an autonomous cart 180B. A drone 170 may also be available for scheduling and communicate with the BDCS 111. The BDCS 111 may have mapping information to assist with routing of the automatons 170 or 180 to a smart premises 120. Customer delivery/pickup preferences, and building infrastructure information may be present in a database coupled to a building infrastructure cloud service (BICS) 112. For instance, robot 180A may require charging sooner than the cart 180B. Thus, knowledge that premises 120 has or does not have a charging station 190 may be useful to proper scheduling. In an example, scheduling for premises 120 may be for two deliveries to two customers. Each customer may have a different level SLA (service level agreement). Initial scheduling may be predictive such that delivery to both customers will meet their various SLAs.

The BICS 112 may be available on the cloud for providing information about the building infrastructure or client preferences. The BICS 112 may provide specific information about entry locations, time for travel between two points in the building based on the type of delivery device/vehicle, client or building management preferences for delivery times and locations, availability of a signing authority, etc. In an embodiment, the BICS 112 may have information about temporal events such as elevator outages. Information from the BICS 112 may assist the autonomous vehicle or originator with planning. For instance, the BICS 112 may provide operational hours for various entrances or drone landing pads, service elevators, etc. A plan to meet the objectives may take this information into account in scheduling the service device and when to commence the service. When a BICS 112 is unavailable, the service device (e.g., drone, robot, or autonomous vehicle, etc.) may need to rely on stored or cached information and default assumptions until the device comes into closer proximity with the smart premises 120.

A cross-section of smart premises 120 is shown to illustrate various features of the premises, or building. It will be understood that many variations of architecture and location for resources may be implemented in practice. For instance, in an embodiment, a landing platform 130 for a drone 170 is shown, with a landing beacon 160. In embodiments, smart premises 120 may have multiple platforms or landing sites for drones, such as on the roof, intermediate balconies, patios, or none at all. Each landing site may have its own beacon. An entry beacon 140 may negotiate entry into the premises 120 by the automaton. Additional beacons 150 may be located on each floor, or more than one on each floor, to assist in internal premises navigation, or authentication/authorization for secured locations on the premises.

In an embodiment, a building infrastructure local service (BILS) 122 may be available to coordinate with the automaton once it has reached or entered the smart premises 120. The BILS 122 may provide the same, or reduced, functionality as that provided by the BICS 112, as discussed above. The BILS 122 may provide full or limited capabilities in the event that the cloud service is unavailable.

Figure 2:
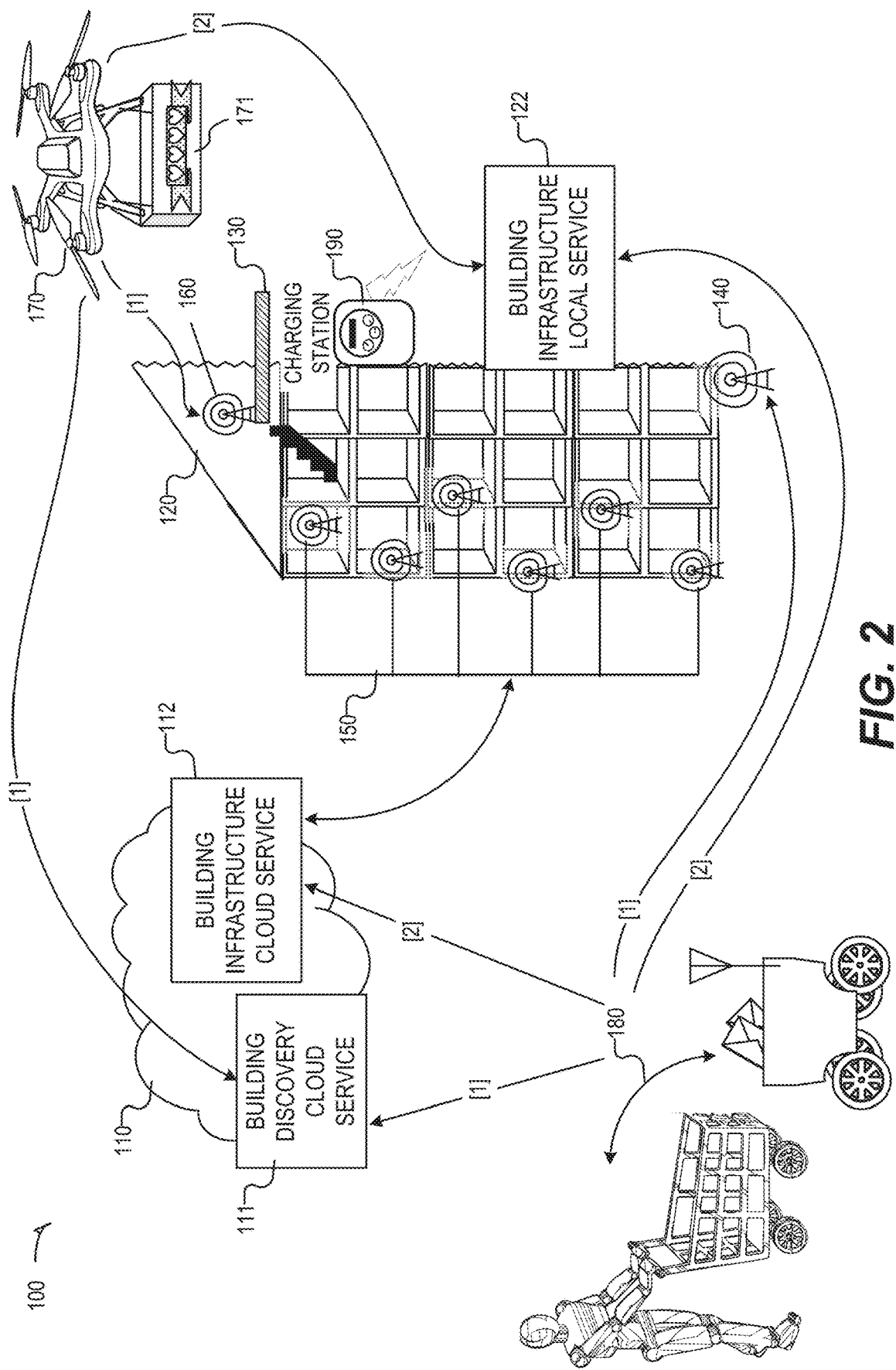
FIG. 2 is a diagram illustrating an automaton flow through an example system, as shown in FIG. 1, according to an embodiment.

FIG. 2 is a diagram illustrating an automaton flow through the example system 100 shown in FIG. 1, according to an embodiment. The notations [1] and [2] illustrate two different use cases for an automaton's mission, and will be discussed separately. For instance, use case [1] illustrates a device originating from a base of operations with BDCS 111 being available. Use case [2] illustrates a device originating from the base without a BDCS 111 available for coordination. Other differences in the use cases will be described below.

In an embodiment, an automaton interoperates with resources in a smart building, or smart premises 120 to expose discoverable services which support bidirectional exchange of information and usage by autonomous entity. In both use cases, ([1] and [2]), an autonomous entity 170, 180 begins its engagement with intelligent premises 120 with a discovery process. This discovery may be referred to as the "point of origin (PofO)." The PofO may be different based on the initial connection acquisition as autonomous entities enter the building, or begin their service from different locations. For example, in use case [1], the automaton may receive guidance and customer SLA or other mission information from a BDCS 111. Once the automaton receives building and location information, travel or journey intermediate tasks and selection of delivery method may be determined. Once the automaton arrives in proximity to the smart premises 120, it may negotiate or communicate with the BILS 122 to determine next steps to complete the mission. In an embodiment the BICS 112 may be available for advanced coordination in the journey. In another embodiment, the automaton may communicate with entry beacon 140 and not BILS 122. For example, for ground vehicles 180, the automaton may negotiate with the entry beacon 140, or directly with the BILS 122 to gain entry and for instructions on how to navigate to the final destination. In another example, a drone vehicle 170, with package 171, may negotiate or communicate with the landing beacon 160 for navigation to the specified landing site 130. In various examples, BILS 122, entry beacon 140, landing beacon 160, internal beacons 150, or a combination of one or more of these resources (collectively known as premises communication resources), may provide authorization and authentication of the automaton 170, 180 for entry and exit, to internal locations or landing pads within the smart premises 120. The premises communication resources 122, 140, 150, 160 may provide the automaton with information or events about unexpected changes or updates to routing information, for instance, due to an elevator that is out of service, or high wind conditions prohibiting landing of a drone 170 on the roof, etc. Thus, routing and intermediate tasks necessary to complete the mission may be altered and adapted dynamically. In an embodiment, the authentication may be communicated by a wireless link, such as radio operating in accordance with an IEEE 802.xx family of standards (e.g., 802.11 or 802.15.1, etc.), near field communication (NFC), RFID link, or other wireless communication link. In an embodiment, a physical communication link may be required, for instance, for a more highly secure area. In such a case, the autonomous device may physically connect to a communication link temporarily, or insert a token, cable, or otherwise connect temporarily with a physical connection to initiate authentication or authorization for access.

In use case [2], a BICS 112 may be available so that the automaton may plan for intermediate tasks and perform predictive analysis before becoming proximate to the smart premises location. For instance, the BICS 112 may alert the automaton base that there are localized high winds and that all drone landing locations 130 are closed. Even if typical deliveries to these premises 120 are by drone 170, the base may change the delivery method to ground operation. In another example, the delivery provider may have another base of operations closer to the premises 120. In this case, a first segment of the journey may be performed by a drone 170 to the second base of operations and then hand off the delivery items to an autonomous ground vehicle 180 for the next segment of the journey. Once the delivery automaton is closer in proximity to the premises 120, further instructions may be communicated by the BILS 122.

Beacons 140, 150, 160 may be connected via a local area network (LAN) within the premises 120. Cloud services (111, 112, 122), beacons (140, 150, 160), automatons (170, 180) and a server for base operations (not shown) may be communicatively coupled via a wide area network (WAN) in various combinations. It will be understood that in embodiments, not all cloud services or beacons are necessary to provide functionality as described herein, and that implementations may provide various optional services or features. During discovery process to identify parameters involving the delivery or pickup objectives, endpoint communications with the building infrastructure services 112 or 122 and communication method through beacons 140, 150 or 160 (e.g., LAN or WAN) may be identified for further invocation of various services, such as charging 190.

In an embodiment, the autonomous vehicle may only receive partial information/directions from one stage to next (e.g. start with directions to entry door, then provide route to elevator, etc.). Communication devices or services (e.g., cloud or local service, beacons, etc.) at each stage in the journey may provide the entity and the building infrastructure the chance to dynamically adjust the route, based on conditions/events in public spaces, as well as the building, or to revisit and optimize what the vehicle may do. The service requirement may be decomposed into the building intelligent infrastructure 120 and may be organized in such a way that only a fraction of the routing and requirements are passed onto the autonomous entity at any point in time. This means that an overall service contract may be managed and orchestrated by the intelligent infrastructure 120, which may be permitted to modify a subsequent operations in order to remediate or adjust when an incremental service objective is missed. Furthermore, this allows for an efficient management of the autonomous entity, whereby the power expenditure is minimized according to the minimal pre-programming/training needed to handle a fraction of the overall service outline. In other words, the autonomous vehicle may obtain just-in-time and just-enough-knowledge to advance incrementally.

Embodiments herein describe how to deliver goods and services with minimal or no human intervention, quickly, safely, and adaptively to endpoint constraints and requirements, and allow for extensible linking into other services at endpoints. Embodiments may be designed for versatility, low cost and complexity, and for smart, extensible, and standardizable inter-operation between intelligent autonomous visiting entities (e.g., robots, robotic carts, drones, etc.) and interactive Internet of Things (IoT) infrastructures at destination sites. Embodiments may rely on trusted machine to machine (M2M) or peer to peer (P2P) communication for such inter-operation for dynamic adaptability, and safe operations.

The described protocol layers over existing beacon technologies to facilitate IoT/Robotics, but embodiments may also be beneficially targeted to assistive technologies for disabled persons.

Embodiments may use radio frequency identification (RFID) tags and devices, and beacons as underlying mechanism, but also provide higher-level services on top. Embodiments may be augmented with smart beacons which may relay updated on premise policies and manage the status of the service level agreement (SLA) for the service delivery. Building infrastructure Services 112, 122 may grab the current status for tracing and tracking and receive information about changes in the delivery mechanisms, such as speed-up, slow-down, delay, pause, alter course, etc. If the SLA is missed or changed by the principal—for example, if the recipient is delayed in arriving at the delivery location—embodiments may interface with the SLA information and delay the delivery by some factor of time.

Distributing (e.g. federating) control and instructions at different stages of the journey and to cloud and localized devices that are more likely to have up to date information regarding a particular stage in the journey (e.g., just enough knowledge and just in time principle) may save power for the delivery vehicle, and customize and improve security of access. Federation of operation enables new credentials, logs and route evaluation/replanning at each intermediary stage. Beacons may be used for bootstrapping.

Figure 3:
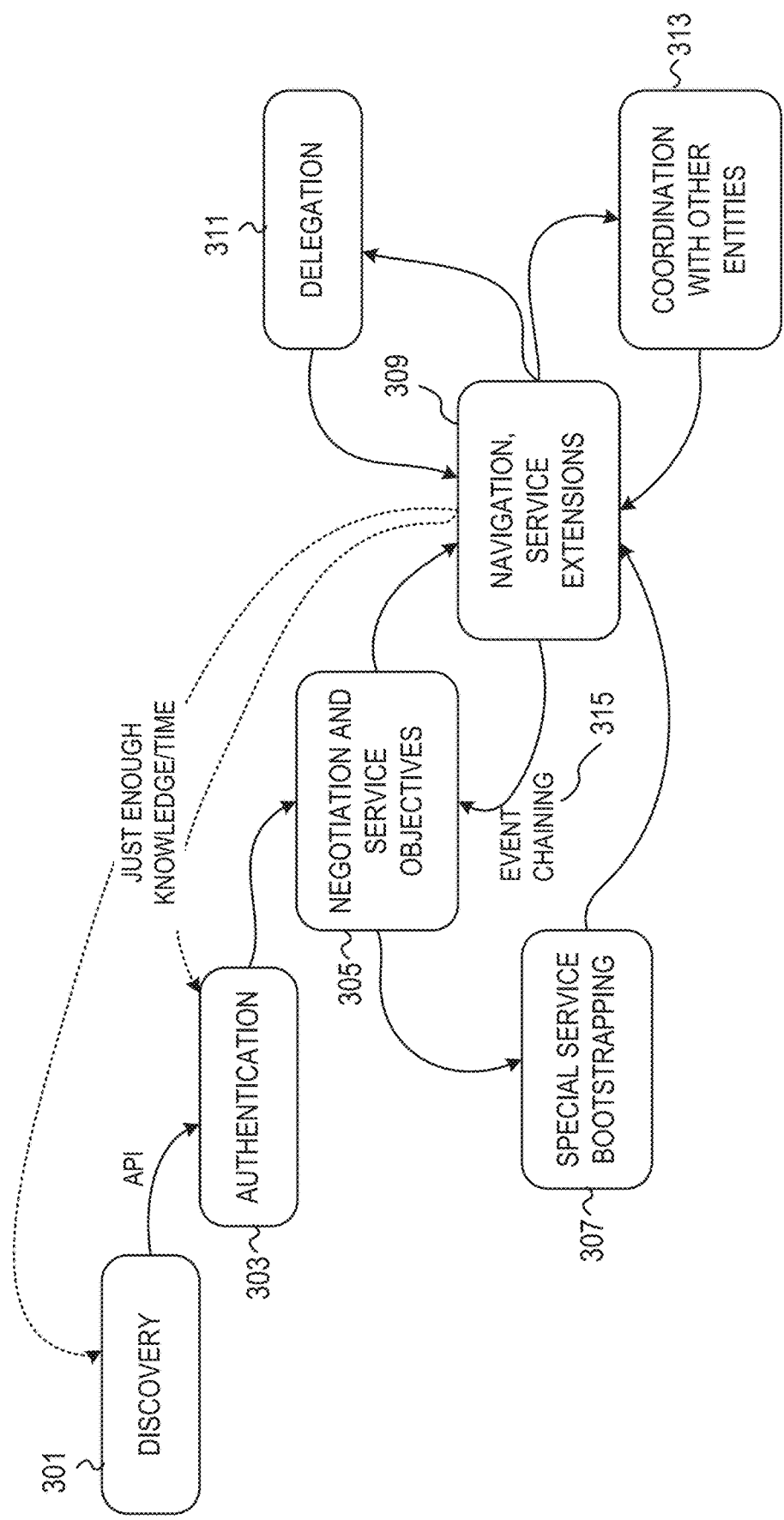
FIG. 3 illustrates entity state transition throughout a delivery mission, according to an embodiment.

FIG. 3 illustrates entity state transition throughout a service objective, or mission, according to an embodiment. For illustrative purposes, states and activities shown in FIG. 3 will be described in conjunction with the components as shown in FIG. 2. Once a service mission has been requested (e.g., pickup, delivery, special service, etc.), the automaton may be put into a discovery state 301. A module or logic for discovery 301 may allow interaction between a robotics system and a building discovery service to discover information about the building or service location that will assist in scheduling the service. A combination of public navigation sources, building discovery cloud services, and building infrastructure cloud service may be used in the scheduling process.

BDCS 111 may be provided with a known address via an application program interface (API) where the known address may translate to geographical (or spatial with 3D) coordinates or a street address into an API endpoint for smart premise. Interaction with BDCS 111 may occur at the time of planning a service at base headquarters, and used to select what type of autonomous platform is appropriate. BDCS 111 may also provide a known endpoint, accessible thru network 110 and defined API which supports a look-up of geographical coordinates or street addresses to provide details to BICS 112 or BILS 122. BDCS 111 may serve multiple buildings and provide functionality similar to a domain name system (DNS) server. Similar to DNS, BDCS 111 may be a distributed and federated service. Depending on the type of service requested, for instance, requiring a specific person to accept delivery in case of "certified mail" rather than just delivering to an address, additional negotiations may take place to plan the delivery, including agreement on time and location. BICS/BILS (112/122) may provide locations of different entrances depending on the delivery method, capabilities of autonomous vehicle and type of service, as well as instructions to find an entry beacon 140 for further details. Discovery 301 may also include additional telemetry, real-time changes, events, hazards etc., as reported by autonomous vehicles that are progressing on their individual transactions and paths.

Entry beacon 140 may use common radio frequency (RF) protocol such as Bluetooth®, WiFi®, ZigBee® standards, etc., to broadcast API endpoint within some range. It is expected that the autonomous vehicle will arrive in proximity to the entry beacon 140 using street address or coordinates, where an approximate geographic location may be retrieved from an easily accessible map service. Entry beacon 140 may allow connection of any device on protocol level (either 'open' WiFi®, predefined PIN code, etc.) via a predefined or broadcasted connection point for authentication, prior to use of any other services. Beacons 140, 150, 160; BDCS 111, BICS/BILS (112/122) may follow various standards (e.g. OCF, OpenFog, etc.) declaring specific protocols on various levels, define APIs, data models and ontology of requests.

In an embodiment, the method of Discovery phase 301 may result in an API endpoint and use a communication method (e.g., Data Distribution Services (DSS) with control, Pub/Sub with control, etc.) which may be used by the autonomous entity for further activities. An API endpoint implementing building services may be:

- hosted in the cloud network 110 (e.g., BICS 112);
- local and available through common RF protocol (e.g., BILS, 122), and may work independently of network 110, and provide security by limiting access with proximity, geographic or geo-fence restrictions);
- provided by a local/edge cloud such as Fog provided by OpenFog Consortium; or
- a combination of both cloud and local services.

The communication method between the autonomous entity and one or more beacon or service resources may be one of:

- local 'here' (through established connection to beacon, network 110 connection is not required, but LAN may be used);
- local 'at place' (e.g., through another beacon located at a different location); or
- cloud (e.g., through the public Internet or private network, and may require authentication at each request).

In an embodiment, some services may be better suited for availability only from a local connection, for security, convenience and high-availability. This eliminates dependency on public network 110 connectivity. Services such as opening doors or calling elevators may prefer to use a local interface for security. Use of a local communication method may also serve the 'Just Enough Knowledge' principle. For instance, in an embodiment, only automatons in the area of RF signal of beacons will be able to get details of BICS/BILS 112/122 information. BDCS 111 may also require authentication prior to sharing of details, thus providing additional level security.

In an embodiment, BDCS 111 may solve reverse tasks by translating actual location into set of BICS/BILS 112/122. This may be useful in case of failures (e.g., finding an exit from premise without being able to access the BILS 122) as well as for hand over between premise and smart city infrastructure. Federation based on location enables extension of premise to any location, thus providing smooth hand-over between locations.

The automaton may use an API to interact and enter the authentication state 303. An API endpoint may provide access to services, and implement authentication, authorization and accounting, tracing/tracking and service status registration. Authentication policy may require:

- mutual authentication, similar to mutual transport layer security (TLS) when IoT/Robotics authenticates that the automaton is connecting to a valid building endpoint, and the building authenticates that the service request is a valid/authorized service;
- authentication of connecting IoT/Robotics;
- identification of connecting IoT/Robotics for applications where security is not required (e.g., for public locations); or
- just-in-time principle operations (e.g., open the door only when the automaton is adjacent to the door, and not before). Authentication may include geo-fencing and have light-authentication when the automaton is distant and require stronger authentication when the entity is in proximity. For instance, authentication may be required at a certain point to be performed using local method via beacons 140, 150, 160 with limited range, and may be by providing a token. In an embodiment, full authentication may be performed in advance to avoid latency. The authentication component 303 may be aware of an upcoming event of authentication.

Mutual authentication may be used to ensure that the devices are legitimate. For instance, the autonomous vehicle may provide forward authentication that it is actually the identity that is presented (e.g., such as a specific delivery service), by providing authentication from the autonomous vehicle to the premises communication resource(s) (e.g. beacons and infrastructure services). Reverse authentication from the premises communication resources to the autonomous vehicle may serve to ensure that the autonomous vehicle is actually communicating to the proper building infrastructure, and not a fake service which may misguide the vehicle. Another use of mutual authentication is in a basis for billing. Some of the building services may be free (e.g., no additional monetary cost), but others may require a payment agreement (such as, for use of a charging station, use of fast/priority elevator to shorten delivery time, use of special parcel lockers, for instance, with refrigeration or warming capabilities, delivery to specific areas of building, or use of specific delivery methods such as drones, etc.).

During authentication, credentials may be exchanged, and the autonomous vehicle may be given a token, provided with the ability to locate other APIs, provided instructions to follow an entry beacon, etc. In an embodiment, the entry beacon 140 may incorporate the credential exchange and forward an issued token, etc., rather than communication with BICS/BILS 112/122.

Once authenticated, the autonomous vehicle may proceed to negotiation and service objective state 305. At this point the autonomous vehicle has been authenticated and authorized and linked to an entry beacon 140, 150 "point of origin". The service objective may be received by the BICS/BILS 112/22, which may optimize the parameters for deployment, build the negotiation agreements with other existing services and transactions and parse the events and sequence intermediaries. When the autonomous vehicle reaches an entry portal, the first instruction guides it to the first in a sequence of intermediaries, such as beacons, with which the autonomous vehicle may communicate as it advances through the premises towards its final destination. An intermediate may act as a communication pathway to the building infrastructure services (BICS/BILS 112/122) either locally or via the cloud. In an embodiment, an intermediary may utilize wireless coverage in the premises (e.g., WiFi®, LTE/5G, etc.) to maintain continuous contact. In another embodiment, the intermediary may be a limited range beacon which provides access to BICS/BILS 112/122 only when the vehicle is in close proximity. The intermediaries may remain in constant contact with the service objective management system, which actively manages the service level agreement associated with the transaction and modifies/updates the next intermediary with new or additional instructions if modification is needed.

Using bidirectional transfer of information between the autonomous vehicle and the different portals (e.g., premises communication resources) within the premises 120, the autonomous vehicle may also request and receive enhanced building services such as recharging, using a network or broadband communication hotspot, and use of other premium facilities, etc. The premises 120 may be treated as a collection of cooperating domains, each of which may coordinate navigation internal to itself, but also collaborate with common services during the autonomous vehicle's use of common facilities (elevators, conduits, etc.). Other beacons may guide the autonomous vehicle to reach the building premises, to parking garages, and recharge points, etc.

In an embodiment, the BICS/BILS 112/122 may negotiate with semi-autonomous devices such as a semi-automated wheelchair for a disabled person that interacts with the premises 120 to open doors, call elevators, plan routes inside building, etc.

Once the autonomous vehicle has negotiated steps toward meeting the service objective, a navigation and service extensions component 309 may be used to assist in meeting the intermediate objectives. For example, a service provided by the premises 120 may be a navigation service, e.g., provide directions to specific rooms, units, or locations in building for fulfillment of the earlier negotiated service.

In an example, there may be multiple delivery/pickup points for the same target person/office, depending on the security, secrecy, or physical contents. The protocol for communication may include a communication method allowing the autonomous vehicle to interact with the building services 112/122 to (a) provide information; (b) receive questions to which the autonomous vehicle may not have an answer, and in that case, contact the sender for more information not included in the shipment information, so that those questions may be answered; or (c) receive directions that may be computed in real time by the building services 112/122 in order to direct the autonomous vehicle to the optimal drop-off point.

There may be multiple paths to the same delivery point or pickup point, and the path to be taken similarly depends on above. For example, if the service elevator in the back of the premise is the usual mode of travel to another floor, but is temporarily out of service, the building infrastructure service 112/122 may provide the autonomous vehicle this information during negotiation of objective 305, or during navigation 309 when the information has changed since time of entry into the premises 120.

In an embodiment, there may be additional signatures required besides acknowledgements that are delivered as already described. These additional signatures may be used to provide end-to-end acknowledgement and a time marker, for the purpose of guaranteeing the chain of custody for an important item.

Depending on the nature of delivered goods, some specific locations may be recommended, for instance, a secured parcel locker, post box or parcel fridge/cryogenic chamber or warming location (e.g., food or pharmaceutical delivery).

During navigation to the next destination in the premises 120, other localized beacons 140, 150, 160 may be used to achieve precision in internal navigation. In another embodiment, the autonomous vehicle may be given local point-to-point directions/maps and other navigational aids as it progresses. By providing just-in-time navigation to the autonomous vehicle, long and complex directions are not necessary to be locally stored in the autonomous vehicle, thus allowing for reduced memory in the autonomous vehicle, saving costs.

The premises 120 may give custom navigation/help that may be needed (e.g., the autonomous vehicle may need a special route if it is transporting confidential content). Directions provided to autonomous vehicle may include scripts to communicate with other beacons/APIs, and may provide sequences of operations based on known map of building and policies.

It may be necessary, for particular types of delivery, for the resources in the vicinity of vehicle navigation to further provide events to services that depend on completion of delivery. This may be referred to as event chaining 315. For instance, a person may initiate some completion event that the delivery service is instructed to start, particularly at remote unattended offices. One example of this might be to activate a process, such as putting a delivered vial into a cryogenic chamber and starting a cryogenic operation, if not already started. The autonomous vehicle may be appropriately instructed by a local service to deliver such a completion event for activation. Similarly an autonomous vehicle that receives a package may be instructed by a local service to both generate an event and consume another event; e.g., the event consumed may be to receive and act on specific directions for onward handling of a picked-up shipment.

While providing directions, some pre-authorization may be performed to allow other beacons to accept requests from this autonomous vehicle For example, elevator control may have a policy, allowing it to move only to predefined levels of the premises 120 for autonomous vehicles, thus increasing security. This security may be further enhanced by requiring the use of tokens or the like.

In an embodiment, additional special service bootstrapping 307 may be available. Tracing and tracking operations may be used to trace and track the progress of the autonomous vehicle through the service as it is in route. This may ensure that the SLA is going to be met based on the contractual agreement. Tracing and tracking may also serve to dynamically modify the SLA if the originator/principal chooses. Further, tracing and tracking operations may facilitate the changes/remediation, if needed, in order to ensure that the SLA is being met. This may be a data-point, and input to the system, as well.

In an example, the autonomous vehicle is required to deliver a parcel to recipient R. Thus, tracking recipient R in the building may facilitate proper delivery. The autonomous vehicle may ask building service "please advise if recipient R is in the premises 120 now and, if not, when will recipient R be present." In-premise building services may use various sources to ascertain the information, such as parking data and software agents running on recipient's equipment such as a smartphone to get recipient R's actual location, notify the recipient, forward to the autonomous vehicle the actual location, and overall negotiate delivery with the recipient using the premise as broker.

Another special service that may be offered is power charging. An autonomous vehicle may enter a building for a charging objective either in conjunction with a pickup or delivery, or independently. In an example, an autonomous vehicle may be scheduled to deliver a package to the premises 120, and predicts that a recharge will be necessary after completion. However, the premises 120 may not have a charging station, but an adjacent smart building (not shown) may have that capability. In this case, two objectives may be scheduled at the home base, e.g., (1) delivery package, and (2) recharge. Instructions to complete the recharge may be offered dynamically, after delivery is complete, by a cloud service. When the premises 120 has the capabilities to offer the recharge service, BILS 122 may direct the vehicle to a recharge point if requested.

In an embodiment, a billing and accounting service may be provided as a special service. To support potential revenue sharing, use of specific services in the premises 120 may be accounted. For example, charging stations for autonomous vehicles, or use of cryogenic chambers for food storage may require a fee for service. In an example, charging may be billed to the originator and the use of a cryogenic chamber or parcel locker may be billed to the recipient. Some services may be fee split, or be free for a limited time, etc.

A delegation state 311 may require negotiation among building and delivery resources. For instance, a drone 170 may have been dispatched with a package 171 for delivery on landing pad 130. Once the drone 170 arrives at the premises 120, it may learn that the landing pad 130 is no longer operational for the day. In this case, the drone 170 may need to delegate delivery to a ground vehicle 180, or provide an alternate delivery site. A delegation module 311 may communicate with the navigation services 309 to be directed to an alternate landing site, or to hand off the package 171 to a ground vehicle 180. In some cases, this may require landing at a nearby premises to perform the hand off. Delegation 311 may coordinate directly with other entities at 313, or communicate via the navigation service extension 309. Environmental conditions of the premises 120, SLA requirements for on-time delivery and other factors may be taken into account during the delegation process. In an example, delegation may result in a late delivery. Depending on the SLA, this late delivery may trigger a refund to the recipient or whomever scheduled (and paid for) the service objective. In this case, an accounting will be made in the special services 307 for prompt refund.

Coordination with other entities 313 may include negotiation with other delivery agents or vehicles to ensure on-time and safe delivery. For example, the originator may realize that its in-service vehicles are over scheduled, or scheduled to capacity. In this case, negotiation with another provider's autonomous vehicle may be conducted to pass of delivery to another agent. In some cases, delivery may even be passed off to a semi-autonomous vehicle or human agent. Communication with the other delivery agent may be peer-to-peer or via a cloud service. Accounting for the change in agents or vehicle may be performed by an accounting function such as with the special services 307.

It will be understood that the processes as shown in FIG. 3 may be provided by a single service, or compute module, on a server device, or be provided by distributed services/modules, provided by one or more server devices either locally or remotely via one or more cloud services. It will also be understood that while embodiments as described herein do not use a centralized server for command and control of the autonomous device, that the provider or originator of the service objectives may have a central server or distributed servers maintained at a base of operation, or remotely and accessible via a network, to provide for administrative functions and automaton inventory, maintenance, and initial scheduling. The provider may utilize the BDCS 111 directly and collocated with various business functions, or provide the business and administrative functions on a separate server.

Embodiments may provide for a variety of services as described herein in various combinations. For instance, if the BDCS 111 is not available, then public maps may be used to guide the autonomous vehicle to close proximity to the premises 120 before communicating with an entry beacon 140 or BILS 122. If the BICS 112 is available, the autonomous vehicle may communicate with the BICS 112 in advance of leaving the base of operations, or while en route, to obtain more specific delivery information. In an example, and in keeping with the just in time aspect of the system, BICS 112 may provide instructions on which entryway is to be used, and further instructions may be provided at the entryway by the entry beacon 140 or BILS 122.

While alternative embodiments may operate with all components and resources discussed herein, or with only a subset, some common elements may apply to multiple embodiments. For instance, identification and enumeration of available services may be provided by various components as depicted in FIGS. 1-2. Access control to locations and entryways in the premises 120, including special items such as parcel lockers, or charging station areas may be provided using various techniques for authentication, authorization, logging and accounting. Billing details for services may be provided to the accounting module. Dynamic navigation and routing may be adaptive to requirements of the vehicle, or premises, or defined in the SLA. Path optimization may be adaptive and provided or suggested by localized resources after the autonomous vehicle has connected to communication resources within the premises 120. Entry, landing and internal beacons may be used for precise indoor navigation and may directly provide navigation information, or provide precise location information that may be used with a BILS 122 for navigation.

Programmable access to the premises infrastructure, e.g., entryways, elevators, rooftop access, doors, etc., may be available with the appropriate authentication and authorization. Authorization may be temporal in nature and be active for a limited time only when delivery is expected. Further, additional security measures may be standard policy and procedure as some locations. For instance, entry beacon 140 or BICS/BILS 112/122 may direct the autonomous vehicle first to an x-ray or inspection room if packages must be x-rayed or otherwise inspected before final delivery. Enhanced services may be provided, such as charging stations, lockers, dedicated elevators, dumbwaiters, or secure hallways may be available for faster routing for an additional fee, for example. Billing and accounting details may be forwarded to an accounting module or device which has access to customer information, SLA details, billing rules, etc. SLA status, tracing and tracking, and estimated time to completion of service objectives may be monitored and stored for later use and analysis.

Delegation from one delivery mode to another may be available in embodiments. For instance, drone 170 may hand off package 171 to a ground vehicle 180 that is waiting on landing pad 130. The ground vehicle 180 may then complete the final delivery, or hand off the package 171 to another autonomous entity, such as another vehicle or conveyer belt (not shown), for delivery. Delivery to other non-stationary objects through negotiation with a recipient may be performed when the delivery location within the premises 120 is dynamic, or changing in nature.

As discussed above, the autonomous entity may not need to be pre-endowed with pre-learned training, expensive cognition, or pre-programmed with a whole decision tree for every possible but unpredictable eventuality. Instead, the autonomous entity acquires new information at various stages while performing the service objective, and may learn and adapt. The adaptation may be from the just-in-time, tailored knowledge it receives from cloud or localized resources. Consequently power, safety/security risk, and error may be minimized.

Overall, embodiments may solve orchestration problems for interaction between autonomous entities and premises infrastructure. Embodiments may provide a means to set service goals, where those goals may be applied to actions for meeting service objectives. Achievements may be measured as compared to the negotiated SLA, as well as, remediation in case of failures.

Figure 4:
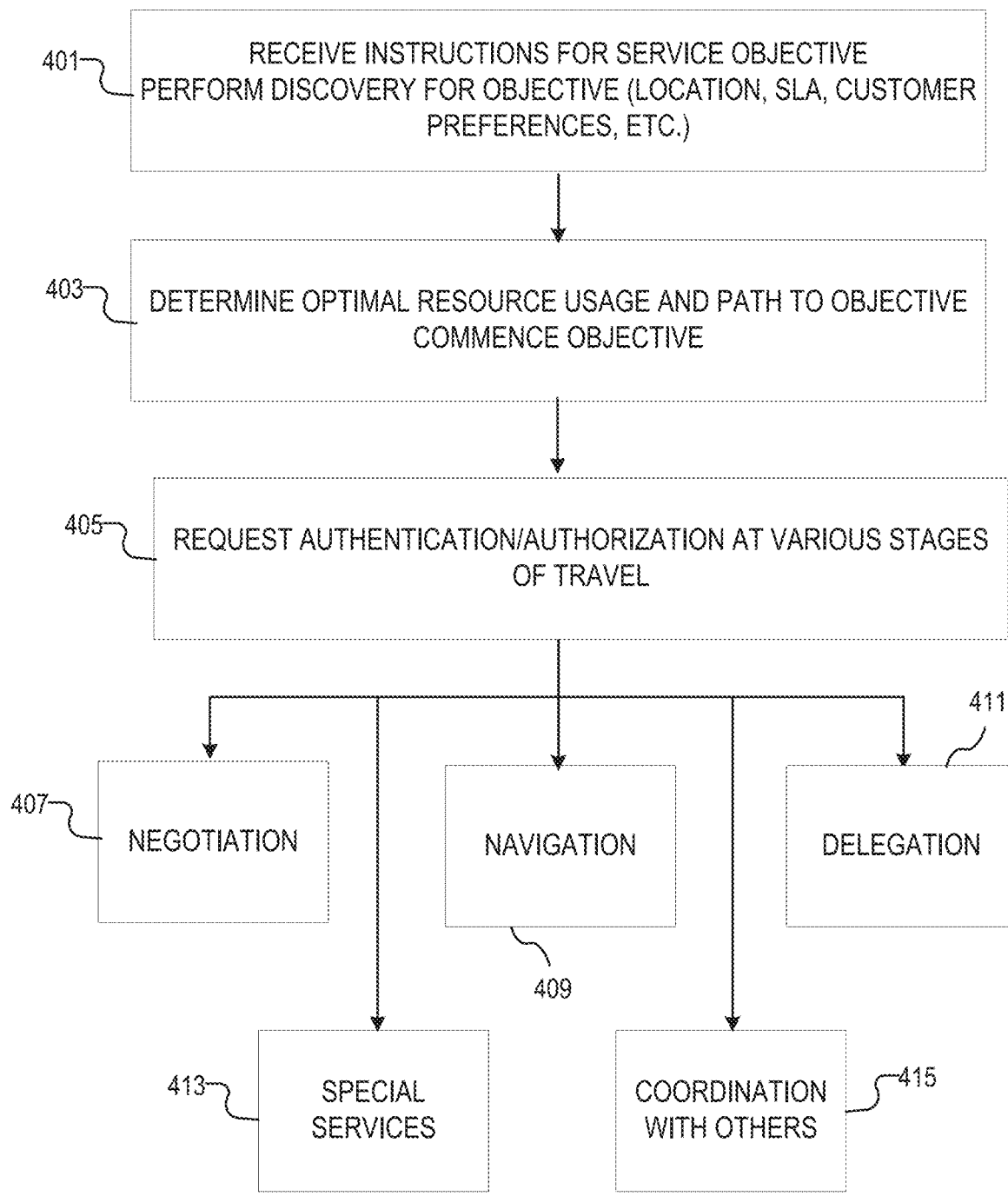
FIG. 4 is a flow diagram illustrating a method for federated automated interoperation between premises and autonomous resources, according to an embodiment.

FIG. 4 is a flow diagram illustrating a method for federated automated interoperation between premises and autonomous resources, according to an embodiment. As discussed above, a provider or originator of services receives a request or instructions for a service objective, in block 401. The service objective may include, but is not limited to, pickup or delivery of a package, recharging, get signature on document, go in for maintenance for a specific device, etc. The service objective may include information about location, customer/client identifiers, signatures required, special building information, SLA requirements for timely completion, customer preferences, passcodes, etc.

Once the parameters of the service are identified, optimal resource usage and path(s) to complete the objective may be determined in block 403. In an example, the building may be located too far away for efficient battery operation of some autonomous vehicles. Stored information about the location may indicate that a drone landing pad may be used with a hand off to a ground vehicle operated by the premises. Other information may include temperature or environmental requirements for food or pharmaceutical delivery, thus requiring a special environmentally controlled vehicle (e.g., heated or refrigerated). A scheduling service at the originator base may aggregate the information about the objective and select an appropriate service device (e.g., autonomous vehicle) based on availability, operational parameters, etc. Once the service autonomous vehicle is selected, an initial path to the objective may be identified. The initial path may be selected using information from one or a combination of (a) public navigation and mapping services given an address; (b) a building discovery cloud service; and (c) a building infrastructure cloud service, as discussed above. Once the initial path is provided to the autonomous vehicle, and loaded with a delivery package if necessary, the vehicle may commence on the initial path to objective.

During the initial journey to the objective, unforeseen events may require adaption of the path. In an example, a road or sidewalk may unexpectedly close or become impassable. A drone landing pad may become unusable in high winds, etc. The autonomous vehicle may query a cloud service for next instructions, or receive pushed instructions on-the-fly directing it to change course.

Once the autonomous vehicle has arrived within proximity of the smart premises, authentication and authorization techniques may be initiated to gain entry into the premises, in block 405. An entry beacon on building infrastructure service (local or cloud), may provide additional passcodes or tokens for entry, and next step instructions for meeting the service objective. Additional authentication and authorization handshakes may be required at multiple points in the journey while traversing the premises.

Depending on intermediate and final objectives, various communications between the autonomous vehicle and communication nodes in the premises may be performed in blocks 407, 409, 411, 413 and 415. Continued negotiation between the vehicle and various beacons, entry or access points, transport devices (e.g., elevators, conveyer belts) may be performed in advance or when in proximity, in block 407. Continued and adaptable navigation information may be provided by beacons or building infrastructure services in block 409, to guide the vehicle to the next stage in the journey to objective completion. Special services, as discussed above, may be requested or offered and negotiated in block 413.

If it is determined that the autonomous vehicle cannot complete the objective, for instance, due to low battery, malfunction, improper form factor for path, unauthenticated secure modes, etc., then delegation to another device or vehicle may be assigned and negotiated in block 411. In some cases, additional coordination with others may be necessary in block 415, and as described above.

Figure 5:
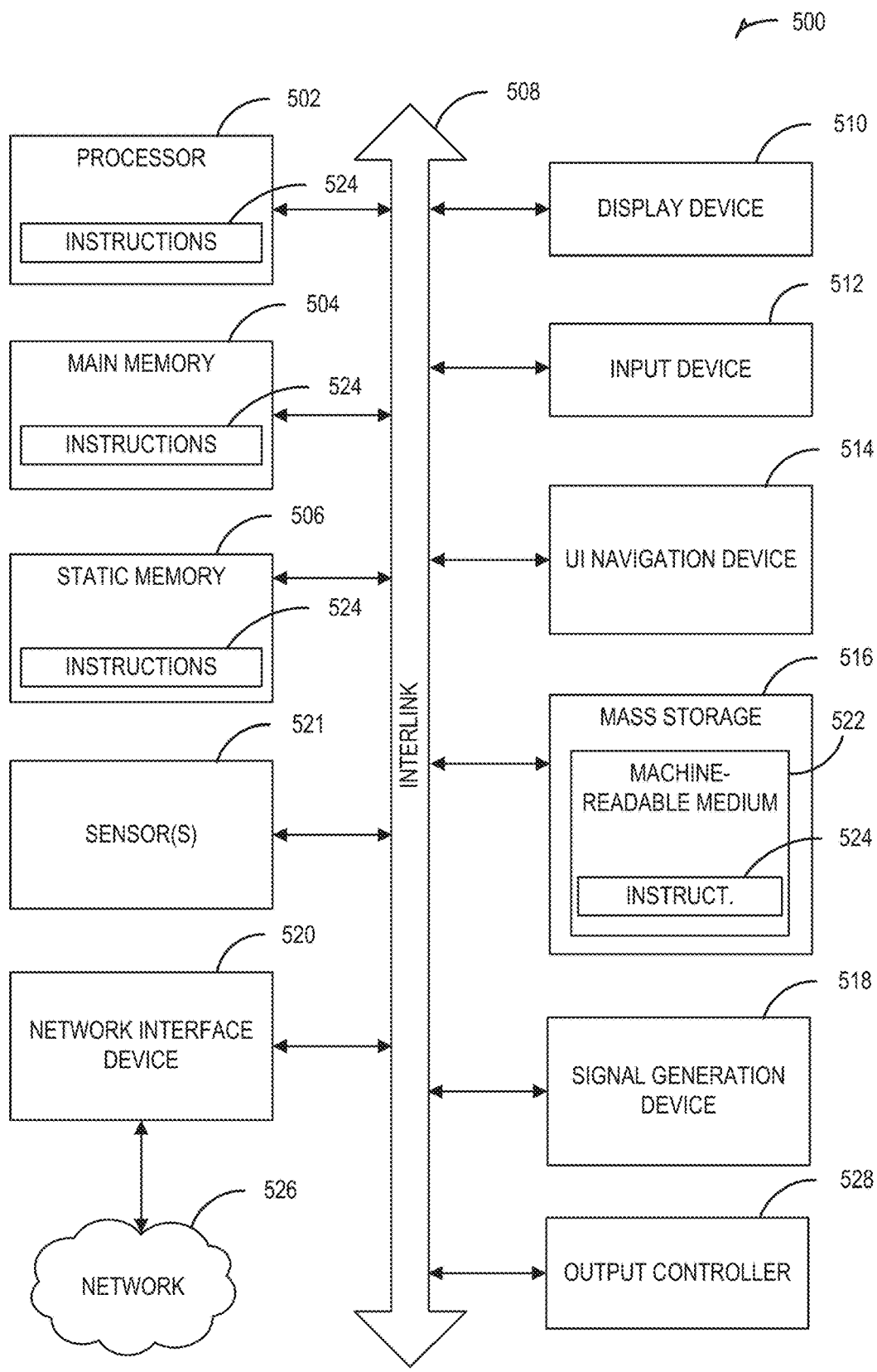
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes and Examples

Examples may include subject matter such as a method, means for performing acts of the method, at least one machine-readable medium including instructions that, when performed by a machine cause the machine to performs acts of the method, or of an apparatus or system for federated automated interoperability between smart premises and autonomous resources, according to embodiments and examples described herein.

Example 1 is an autonomous entity, comprising: a processor that, when in operation, is coupled to at least one communication link for communicating with services and other entities; a mobility component configured to enable the autonomous entity to travel independently without human intervention to fulfill a service objective; a guidance system operable by the processor, configured to send navigation instructions to the mobility component to guide the autonomous entity to a specified location and communicate with an external navigation service via the at least one communication link, wherein the guidance system is configured to receive updated location or path information at an intermediate location from the external navigation service, and wherein the external navigation service is one of a cloud service or a local service provided by a smart premises; a bidirectional authenticator operable by the processor configured to provide bidirectional authentication, authorization and security information between the autonomous entity and a second entity via the at least one communication link, wherein the at least one communication link is one of wired or wireless; negotiation logic operable by the processor configured to communicate with any one or more of a local building service, a cloud building service, and a beacon coupled to a smart premises location, for negotiation of intermediate and final tasks in completion of the service objective, wherein the negotiation logic is configured to aggregate guidance information, service level agreement information, building infrastructure information, and operability information to determine a next intermediate or final task to completion of the mission objective.

In Example 2, the subject matter of Example 1 optionally includes delegation logic operable by the processor and coupled to the at least one communication link, the delegation logic configured to identify a second entity to complete the service objective, responsive to an indication that the autonomous entity cannot complete the service objective independently, and further configured to relocate to a location for hand off of the service objective to the second entity.

In Example 3, the subject matter of Example 2 optionally includes wherein the autonomous entity comprises a drone, and wherein delegation logic is configured to enable the drone to automatically hand off the service objective to a ground vehicle for completion of the service objective after arriving at a landing site of the smart premises.

In Example 4, the subject matter of any one or more of Examples 1-3 optionally include wherein the negotiation logic is configured to receive, while en route, environmental information about building infrastructure, environmental event information, and alternative intermediate tasks to modify a previously planned schedule to the service objective and create a modified schedule, wherein the modified schedule includes at least one of a route to a location, a velocity, a direction vector, a hand-off location for delegation, a wait directive, a billing event, or instructions to initiate a special service.

In Example 5, the subject matter of any one or more of Examples 1-4 optionally include wherein the negotiation logic is configured to negotiate a special service provided by the smart premises, wherein the special service is a fee for service, and use of the special service triggers a payment to a provider of the special service.

In Example 6, the subject matter of Example 5 optionally includes wherein the special service is selected from the group of services including power charging of the autonomous entity, authorization to traverse a secured pathway, rental of a parcel locker, rental of an environmentally controlled storage area, or delegation to a second entity.

Example 7 is a smart premises for providing federated automated interoperation with autonomous resources, comprising: a network of premises communication resources including at least one of: an entry beacon, an interior navigation beacon, or a landing beacon, and a building infrastructure service configured to provide current information about building infrastructure including mapping and location information, localized event information, premises environmental information, special services information or customer information, wherein the building infrastructure service is one of a local service available when in close proximity to the smart premises or a cloud service available via a network connection, wherein the network of premises communication resources is configured to authenticate an authorized autonomous entity at localized points in the smart premises and to negotiate entry authorization, and provide guidance to a next location.

In Example 8, the subject matter of Example 7 optionally includes one or more special services, wherein the autonomous entity negotiates with the network of premises communication resources to obtain use of the special service.

In Example 9, the subject matter of Example 8 optionally includes wherein the special service is a fee for service, and use of the special service triggers a payment to a provider of the special service, and wherein the special service is selected from the group of services including: power charging of the autonomous entity, authorization to traverse a secured pathway, rental of a parcel locker, rental of an environmentally controlled storage area, or delegation to a second entity.

In Example 10, the subject matter of any one or more of Examples 7-9 optionally include wherein the building infrastructure service is configured to send to the autonomous entity, while the autonomous entity is en route, environmental information about building infrastructure, environmental event information, and alternative intermediate tasks to modify a previously planned schedule to a service objective and generate a modified schedule, wherein the modified schedule includes at least one of a route to a location, a velocity, a direction vector, a hand-off location for delegation, a wait directive, a billing event, or instructions to initiate a special service.

In Example 11, the subject matter of any one or more of Examples 7-10 optionally include wherein the entry beacon is configured to negotiate a route portion in the smart premises to enable the autonomous entity to complete a service objective within parameters of a service level agreement between a provider of the autonomous vehicle and a customer within the smart premises, wherein the route portion is one of a route to completion of the service objective or an intermediate route to an intermediate location.

Example 12 is a computer implemented method for providing federated automated interoperation between autonomous resources and smart premises, comprising: receiving instructions for a service objective; performing discovery of initial tasks for completing the service objective; identifying an optimal autonomous resource for completing the service objective while maintaining requirements of a predefined service level agreement; determining a path to the service objective for the optimal autonomous resource; navigating the optimal autonomous resource through the initial tasks, wherein each initial task comprises an intermediate goal toward completion of the service objective; and negotiating with a network of premises communication resources including at least one of: an entry beacon, an interior navigation beacon, a landing beacon, or a building infrastructure service, wherein the negotiating includes authenticating the autonomous resource with the network of premises communication resources and receiving at the autonomous resource a new task toward completion of the service objective.

In Example 13, the subject matter of Example 12 optionally includes wherein the negotiating further comprises authorizing the autonomous resource for a path or service within the smart premises.

In Example 14, the subject matter of any one or more of Examples 12-13 optionally include automatically delegating completion of the service objective by the optimal autonomous resource to a second resource, wherein the second resource is one of located within the smart premises or at a secondary intermediate location; and responsive to delegating to the second resource owned by a third party, triggering a billing event for payment of use of the second resource.

In Example 15, the subject matter of any one or more of Examples 12-14 optionally include negotiating use of a special service in the smart premises, wherein the special service is a fee for service, and use of the special service triggers a payment to a provider of the special service, and wherein the special service is selected from the group of services including: power charging of the autonomous entity, authorization to traverse a secured pathway, rental of a parcel locker, rental of an environmentally controlled storage area, or delegation to a second entity.

In Example 16, the subject matter of any one or more of Examples 12-15 optionally include wherein the negotiating comprises negotiating with the building infrastructure service to receive while en route, environmental information about building infrastructure, environmental event information, and alternative intermediate tasks to modify a previously planned schedule to the service objective, wherein the modified schedule includes at least one of a route to a location, a velocity, a direction vector, a hand-off location for delegation, a wait directive, a billing event, or instructions to initiate a special service.

Example 17 is at least one computer readable storage medium having instructions stored thereon, the instructions when executed by processing circuitry, cause the processing circuitry to: receive instructions for a service objective; perform discovery of initial tasks for completing the service objective; identify an optimal autonomous resource for completing the service objective while maintaining requirements of a predefined service level agreement; determine a path to the service objective for the optimal resource; navigate the autonomous resource through the initial tasks, wherein each initial task comprises an intermediate goal toward completion of the service objective; and negotiate with network of premises communication resources including at least one of: an entry beacon, an interior navigation beacon, a landing beacon, or a building infrastructure service, wherein the negotiating is to include instructions to authenticate the autonomous resource with the network of premises communication resources and receive at the autonomous resource a new task toward completion of the service objective.

In Example 18, the subject matter of Example 17 optionally includes wherein the instructions to negotiate further comprise instructions to authorize the autonomous resource for a path or service within the smart premises.

In Example 19, the subject matter of any one or more of Examples 17-18 optionally include instructions to: automatically delegate completion of the service objective by the autonomous resource to a second resource, wherein the second resource is one of located within the smart premises or at a secondary intermediate location; and responsive to delegating to the second resource owned by a third party, trigger a billing event for payment of use of the second resource.

In Example 20, the subject matter of any one or more of Examples 17-19 optionally include instructions to: negotiate use of a special service in the smart premises, wherein the special service is a fee for service, and use of the special service triggers a payment to a provider of the special service, and wherein the special service is selected from the group of services including: power charging of the autonomous entity, authorization to traverse a secured pathway, rental of a parcel locker, rental of an environmentally controlled storage area, and delegation to a second entity.

In Example 21, the subject matter of any one or more of Examples 17-20 optionally include wherein the instructions to negotiate comprise instructions to negotiate with the building infrastructure service to receive while en route, environmental information about building infrastructure, environmental event information, and alternative intermediate tasks to modify a previously planned schedule to the service objective, wherein the modified schedule includes at least one of a route to a location, a velocity, a direction vector, a hand-off location for delegation, a wait directive, a billing event, or instructions to initiate a special service.

Example 22 is a system for providing federated automated interoperation between autonomous resources and smart premises, comprising: means to receive instructions for a service objective; means to perform discovery of initial tasks for completing the service objective; means to identify an optimal autonomous resource for completing the service objective while maintaining requirements of a predefined service level agreement; means to determine a path to the service objective for the optimal resource; means to navigate the autonomous resource through the initial tasks, wherein each initial task comprises an intermediate goal toward completion of the service objective; and means to negotiate with network of premises communication resources including at least one of: an entry beacon, an interior navigation beacon, a landing beacon, or a building infrastructure service, wherein the means to negotiate includes means to authenticate the autonomous resource with the network of premises communication resources and receive at the autonomous resource a new task toward completion of the service objective.

In Example 23, the subject matter of Example 22 optionally includes wherein the means to negotiate with network of premises communication resources, further comprises means to authorize the autonomous resource for a path or service within the smart premises.

In Example 24, the subject matter of any one or more of Examples 22-23 optionally include means to automatically delegate completion of the service objective by the autonomous resource to a second resource, wherein the second resource is one of located within the smart premises or at a secondary intermediate location; and means to trigger a billing event for payment of use of the second resource, responsive to delegating to the second resource owned by a third party.

In Example 25, the subject matter of any one or more of Examples 22-24 optionally include means to negotiate use of a special service in the smart premises, wherein the special service is a fee for service, and use of the special service triggers a payment to a provider of the special service, and wherein the special service is selected from the group of services including: power charging of the autonomous entity, authorization to traverse a secured pathway, rental of a parcel locker, rental of an environmentally controlled storage area, and delegation to a second entity.

In Example 26, the subject matter of any one or more of Examples 22-25 optionally include wherein the means to negotiate comprises means to negotiate with the building infrastructure service to receive while en route, environmental information about building infrastructure, environmental event information, and alternative intermediate tasks to modify a previously planned schedule to the service objective, wherein the modified schedule includes at least one of a route to a location, a velocity, a direction vector, a hand-off location for delegation, a wait directive, a billing event, or instructions to initiate a special service.

Example 27 is a system configured to perform operations of any one or more of Examples 1-26.

Example 28 is a method for performing operations of any one or more of Examples 1-26.

Example 29 is a machine readable medium including instructions that, when executed by a machine cause the machine to perform the operations of any one or more of Examples 1-26.

Example 30 is a system comprising means for performing the operations of any one or more of Examples 1-26.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile or non-volatile memory, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter may be practiced with various computer system configurations, including multiprocessor or multiple-core processor systems, minicomputers, mainframe computers, as well as pervasive or miniature computers or processors that may be embedded into virtually any device. Embodiments of the disclosed subject matter may also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A computer implemented method for providing automated interoperation between autonomous resources and a smart premises, comprising:
   receiving instructions for a service objective;
   performing discovery of one or more initial tasks for completing the service objective;
   identifying an autonomous resource for completing the service objective;
   determining a path to the service objective for the autonomous resource;
   navigating the autonomous resource through the one or more initial tasks, wherein each initial task comprises an intermediate goal toward completion of the service objective; and
   negotiating with a premises communication resource of the smart premises;
   wherein the negotiating includes authenticating the autonomous resource with the premises communication resource and receiving at the autonomous resource a new task toward completion of the service objective, wherein the negotiating includes negotiating a second service provided by the smart premises,
   wherein the second service includes a delegation of one or more tasks initially assigned to the autonomous resource to a second entity to complete the one or more tasks initially assigned to the autonomous resource, and
   wherein the second entity is an autonomous vehicle, a semi-autonomous vehicle, or a human agent associated with the semi-autonomous vehicle, and wherein the delegation of the one or more tasks initially assigned to the autonomous resource is communicated to the second entity via an external navigation service,
   wherein the one or more tasks initially assigned to the autonomous resource is handed off from the autonomous resource to the second entity, wherein the second entity completes the one or more tasks initially assigned to the autonomous resource separately from the autonomous resource, and
   wherein the negotiating includes updating the path to the service objective based on a change to at least one intermediate task of the intermediate tasks, and wherein the change to the at least one intermediate task occurs subsequent to an arrival of the autonomous resource or the second entity at the smart premises.

2. The computer implemented method as recited in claim 1, wherein the negotiating further comprises authorizing the autonomous resource for a path or service within the smart premises.

3. The computer implemented method as recited in claim 1, further comprising:
   automatically delegating completion of the service objective by the autonomous resource to a second resource, wherein the second resource is one of located within the smart premises or at a secondary intermediate location; and
   responsive to delegating to the second resource owned by a third party, triggering a billing event for payment of use of the second resource.

4. The computer implemented method as recited in claim 1, wherein the negotiating comprises negotiating with a building infrastructure service to receive while en route, environmental information about building infrastructure, environmental event information, and alternative intermediate tasks to modify a previously planned schedule to the service objective, wherein the modified schedule includes at least one of a route to a location, a velocity, a direction vector, a hand-off location for delegation, a wait directive, a billing event, or instructions to initiate a second service.

5. The computer implemented method as recited in claim 1, wherein the premises communication resource includes at least one of: an entry beacon, an interior navigation beacon, a landing beacon, or a building infrastructure service, and wherein the automated interoperation of the smart premises and the autonomous resource is federated such that the autonomous resource interacts with one or more cloud services or services provided by the smart premises to effect distributed operation or control of the autonomous resource.

6. The computer implemented method as recited in claim 1, wherein identifying the autonomous resource includes maintaining requirements of a predefined service level agreement.

7. At least one non-transitory computer readable storage medium having instructions stored thereon, the instructions when executed by processing circuitry, cause the processing circuitry to:
receive instructions for a service objective;
perform discovery of one or more initial tasks for completing the service objective;
identify an autonomous resource for completing the service objective;
determine a path to the service objective for the autonomous resource;
navigate the autonomous resource through the one or more initial tasks, wherein each initial task comprises an intermediate goal toward completion of the service objective; and
negotiate with a premises communication resource of a smart premises;
wherein the negotiating is to include instructions to authenticate the autonomous resource with the premises communication resource and receive at the autonomous resource a new task toward completion of the service objective, wherein the negotiating includes negotiating a second service provided by a smart premises,
wherein the second service is selected from a group of services including:
power charging of the autonomous resource,
rental of an environmentally controlled storage area, or
delegation of one or more tasks initially assigned to the autonomous resource to a second entity to complete the task, and
wherein the second entity is an autonomous vehicle, a semi-autonomous vehicle, or a human agent associated with the semi-autonomous vehicle, and wherein the delegation of the one or more tasks initially assigned to the autonomous resource is communicated to the second entity via an external navigation service,
wherein the one or more tasks initially assigned to the autonomous resource is handed off from the autonomous resource to the second entity, wherein the second entity completes the one or more tasks initially assigned to the autonomous resource separately from the autonomous resource, and wherein the negotiating includes updating the path to the service objective based on a change to at least one initial task of the initial tasks, and
wherein the change to the at least one initial task occurs subsequent to an arrival of the autonomous resource or the second entity at the smart premises.

8. The at least one computer readable storage medium as recited in claim 7, wherein the instructions to negotiate further comprise instructions to authorize the autonomous resource for a path or service within the smart premises.

9. The at least one computer readable storage medium as recited in claim 7, further comprising instructions to:
automatically delegate completion of the service objective by the autonomous resource to a second resource, wherein the second resource is one of located within the smart premises or at a secondary intermediate location; and
responsive to delegating to the second resource owned by a third party, trigger a billing event for payment of use of the second resource.

10. The at least one computer readable storage medium as recited in claim 7, wherein the instructions to negotiate comprise instructions to negotiate with a building infrastructure service to receive while en route, environmental information about building infrastructure, environmental event information, and alternative intermediate tasks to modify a previously planned schedule to the service objective, wherein the modified schedule includes at least one of a route to a location, a velocity, a direction vector, a hand-off location for delegation, a wait directive, a billing event, or instructions to initiate a second service.

11. The at least one computer readable storage medium as recited in claim 7, wherein the premises communication resource includes at least one of: an entry beacon, an interior navigation beacon, a landing beacon, or a building infrastructure service.

12. The at least one computer readable storage medium as recited in claim 7, wherein to identify the autonomous resource includes maintaining requirements of a predefined service level agreement.

13. An autonomous resource, comprising:
a processor;
a guidance system coupled to the processor;
at least one communication link for communicating with services and other entities;
a bidirectional authenticator coupled to the processor;
memory, including instructions stored thereon, which when executed by the processor, enable the autonomous entity to travel independently without human intervention to fulfill a service objective, wherein to fulfill the service objective the instructions cause the processor to:
send navigation instructions using the guidance system to guide the autonomous resource to a specified location and communicate with an external navigation service via the at least one communication link, wherein the guidance system is configured to receive updated location or path information at an intermediate location from the external navigation service;
provide, using the bidirectional authenticator, bidirectional authentication, authorization, and security information between the autonomous resource and a second entity via the at least one communication link;
communicate with a resource to perform negotiation of intermediate and final tasks in completion of the service objective,
aggregate guidance information, service level agreement information, building infrastructure information, and operability information to determine a next intermediate or final task to completion of the service objective, and negotiate a second service provided by a smart premises;

wherein the second service include a delegation of one or more tasks initially assigned to the autonomous resource to the second entity to complete the task, wherein the second entity is an autonomous vehicle, a semi-autonomous vehicle, or a human agent associated with the vehicle, wherein the delegation of the one or more tasks initially assigned to the autonomous resource is communicated to the second entity via the external navigation service, wherein the one or more tasks initially assigned to the autonomous resource is handed off from the autonomous resource to the second entity, wherein the second entity completes the one or more tasks initially assigned to the autonomous resource separate from the autonomous resource, wherein the guidance information is updated based on a change to at least one task of the intermediate or final tasks, and wherein the change to the at least one task of the intermediate or final tasks occurs subsequent to an arrival of the autonomous resource or the second entity at the smart premises.

14. The autonomous resource of claim 13, wherein the instructions further cause the processor to:

identify the second entity to complete the service objective, responsive to an indication that the autonomous resource cannot complete the service objective independently, and further configured to relocate to a location for hand off of the service objective to the second entity.

15. The autonomous resource as recited in claim 13, wherein the autonomous resource comprises a drone, and wherein the drone is enabled to automatically hand off the service objective to a ground vehicle for completion of the service objective after arriving at a landing site of the smart premises.

16. The autonomous resource as recited in claim 13, wherein the instructions further cause the autonomous resource to receive, while en route, environmental information about building infrastructure, environmental event information, and alternative intermediate tasks to modify a previously planned schedule to the service objective and create a modified schedule, wherein the modified schedule includes at least one of a route to a location, a velocity, a direction vector, a hand-off location for delegation, a wait directive, a billing event, or instructions to initiate the second service.

* * * * *